April 28, 1959 N. FEIS 2,884,204
DEVICE FOR ATOMIZING LIQUIDS
Filed Dec. 7, 1953 6 Sheets-Sheet 1

INVENTOR.
NIKOLAAS FEIS
BY
ATTORNEY

April 28, 1959  N. FEIS  2,884,204

DEVICE FOR ATOMIZING LIQUIDS

Filed Dec. 7, 1953  6 Sheets-Sheet 4

INVENTOR.
NIKOLAAS FEIS
BY
ATTORNEY

April 28, 1959 N. FEIS 2,884,204
DEVICE FOR ATOMIZING LIQUIDS
Filed Dec. 7, 1953 6 Sheets-Sheet 5

INVENTOR.
NIKOLAAS FEIS
BY
ATTORNEY

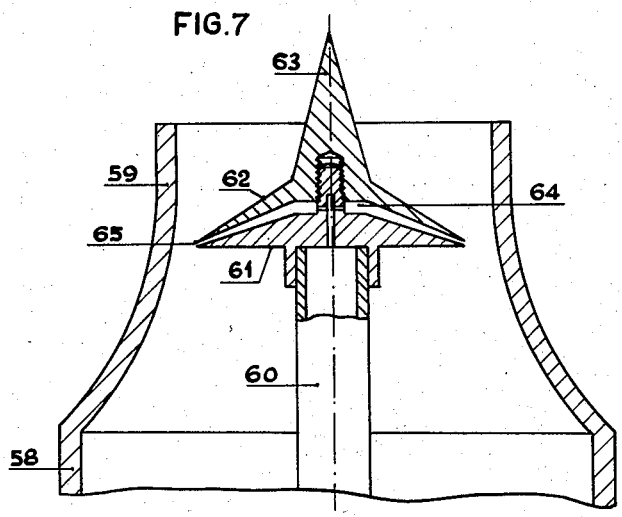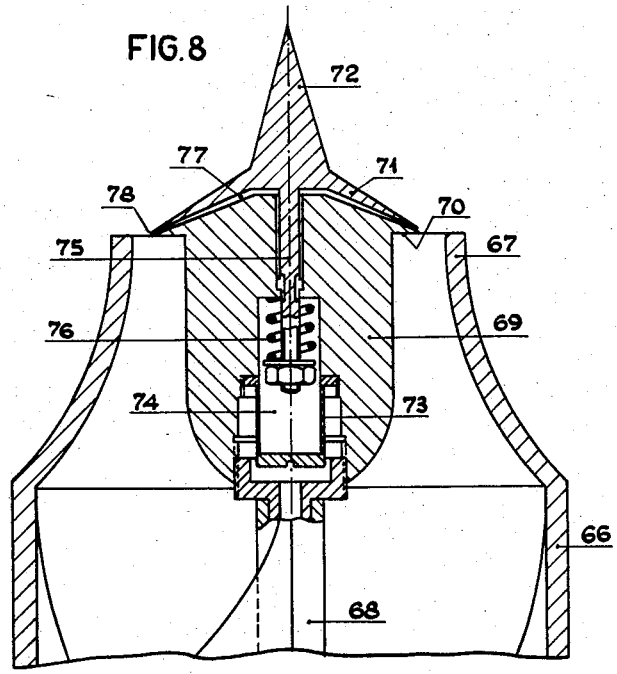

United States Patent Office 2,884,204
Patented Apr. 28, 1959

2,884,204

DEVICE FOR ATOMIZING LIQUIDS

Nikolaas Feis, Wageningen, Netherlands, assignor to Instituut voor Tuinbouwtechniek, Wageningen, Netherlands, a corporation of the Netherlands Application December 7, 1953, Serial No. 396,524

Claims priority, application Netherlands December 8, 1952

17 Claims. (Cl. 239—406)

The invention relates to a process and a device for atomizing liquids of the type in which the liquid is brought into a current of air with a high velocity and is divided into fine drops by this current of air. Where in this specification and claims the word "liquid" is used, it is intended to include emulsions and suspensions as well. It is known that the droplet dimensions depend, inter alia, on the viscosity and the surface tension of the liquid and are further influenced by the air velocity and the relative volumes of the atomized liquid and of the air used for its atomization.

The main disadvantage of known apparatus is, that in order to atomize liquids into droplets of a diameter less than $100\mu$, very great quantities of air and a high air velocity is necessary to atomize even relatively small quantities of a liquid.

The object of the invention is to achieve a very good atomization with substantially lower air quantities and air pressures than are necessary in known apparatus, allowing thereby to atomize liquids in a very economical way.

Other advantages of the invention will become apparent as the description proceeds.

According to the invention a small zone of a highly increased air velocity is created in the air stream, into which zone the liquid to be atomized is introduced as a thin film, this zone being followed by a zone with relatively small but violent vortexes. According to the invention these zones are created by positioning in the air stream a body, e.g. a plate, cone or funnel, provided with a sharp front-edge. Thus at least part of the air stream is compelled to change its direction and to pass around the body, the air in a boundary layer at the surface of the body being strongly accelerated where it flows round the sharp front-edge. This rapidly flowing boundary layer detaches itself from the body surface immediately behind the sharp edge, creating thereby a zone with small, violent vortexes. The liquid film which is introduced into the boundary layer adjacent the sharp front-edge can be formed in the relatively large wake zone adjacent the downstream side of the body, where the air is slowly flowing backwards in the direction of the sharp edge, so that the liquid film can spread itself out unhampered, gradually becoming thinner, as far as the above mentioned edge, without meeting a directed high velocity air stream. The liquid can flow towards the edge from a slit-shaped orifice, either over the downstream surface of the body, or be spouted from such an orifice along this surface at a small distance therefrom. Since in the latter case there is no friction to reduce the velocity of the liquid film, the film can be much thinner and its velocity can be much higher, so that a much finer atomization can be achieved.

It is also possible according to the invention to introduce the liquid directly into the air immediately adjacent the sharp edge of the above mentioned body, as will be described more in detail with reference to the figures.

According to the invention the above mentioned body, if substantially shaped as a cone positioned in the air duct with its base in upstream direction, can be advantageously provided with an extension directed against the air stream. This extension is shaped as a rotation-symmetric body, whose largest cross-section is smaller than the base of the cone. This extension allows to reduce the quantity of air and the air pressure still further. The object of this extension is to increase the air velocity upstream of the cone edge, which is necessary when the quantity of air is very low. The air duct together with this extension offers to the air a relatively narrow passage of annular cross-section, through which the air flows with considerable velocity to the narrow annular gap between the duct and the cone edge, a part of which air flow will be sharply deflected in upward direction in the immediate neighbourhood of the cone base. Air stream of a relatively low velocity will, without such an extension, change its direction so gradually in order to pass through the annular gap, that no strongly accelerated boundary layer will be formed at the sharp edge of the cone. It is advantageous to give this extension the shape of a cylinder with a rounded upstream end. It is of advantage to make the difference between the cone base radius and the radius of the extension substantially equal to the breadth of the gap between the air duct and the cone base edge.

It is also of advantage to provide the air duct with means to give to the air stream a rotary component of motion, positioned upstream of the conic body or its extension.

In order to prevent an extensive wake zone behind the body, wherein a part of the atomized liquid could coalesce into larger drops, the body may have substantially the shape of a funnel, so that part of the air will flow therethrough, or taper to a thin point or wedge. The air carrying the atomized liquid will no more tend to meet immediately behind the body. Any liquid drops possibly deposited on the downstream surface of the body will flow towards the edge of the body under the influence of the air slowly flowing backwards in the direction of said edge, and will be atomized anew.

The invention will be further explained with reference to the accompanying drawing, representing several embodiments, wherein:

Figs. 6, 7 and 8 show in section three further embodiments of the invention.

Figure 1:
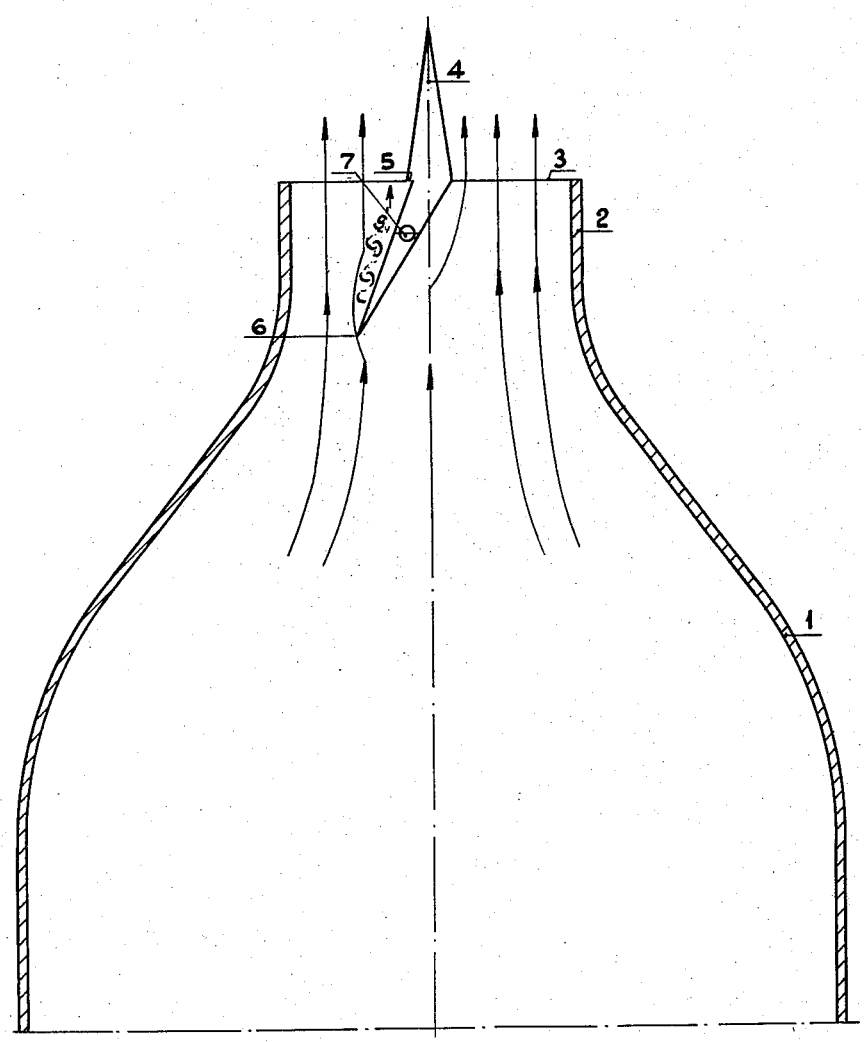
Fig. 1 shows in section an embodiment of the invention.
Figure 2:
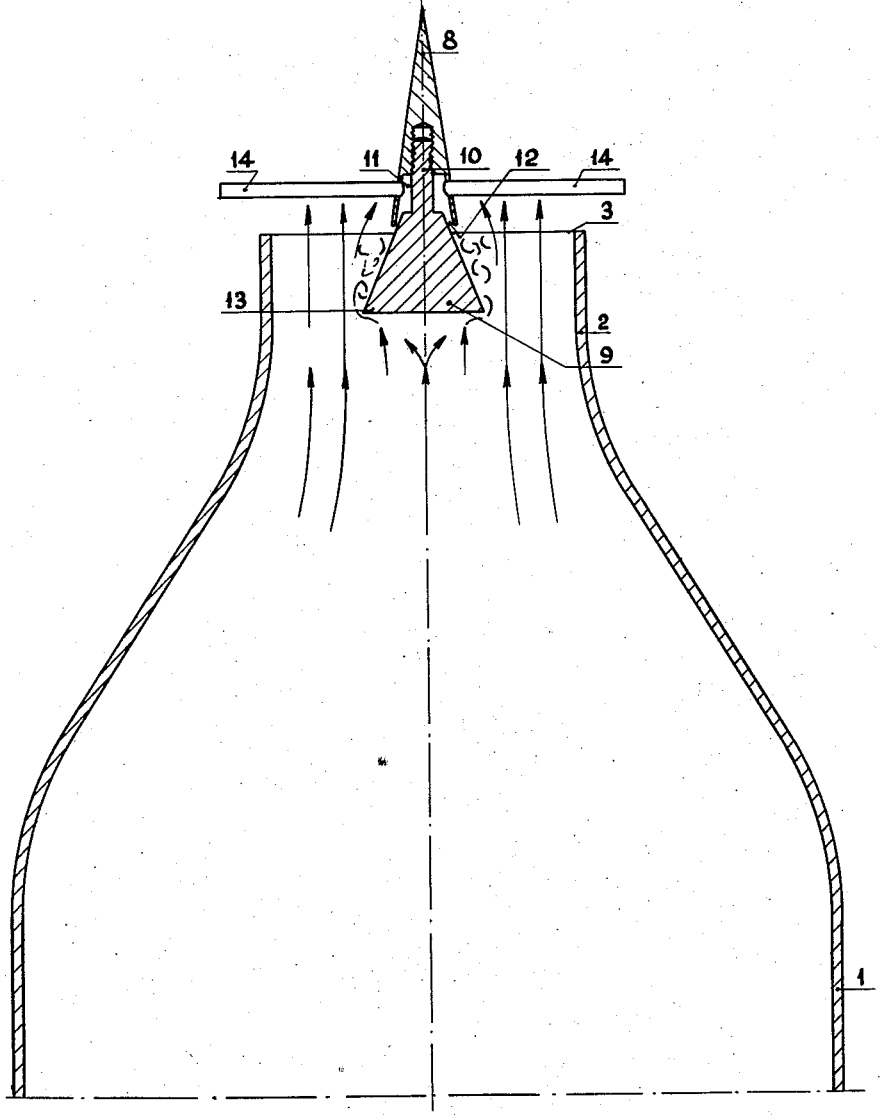
Fig. 2 shows in section another embodiment of the invention.
Figure 3:
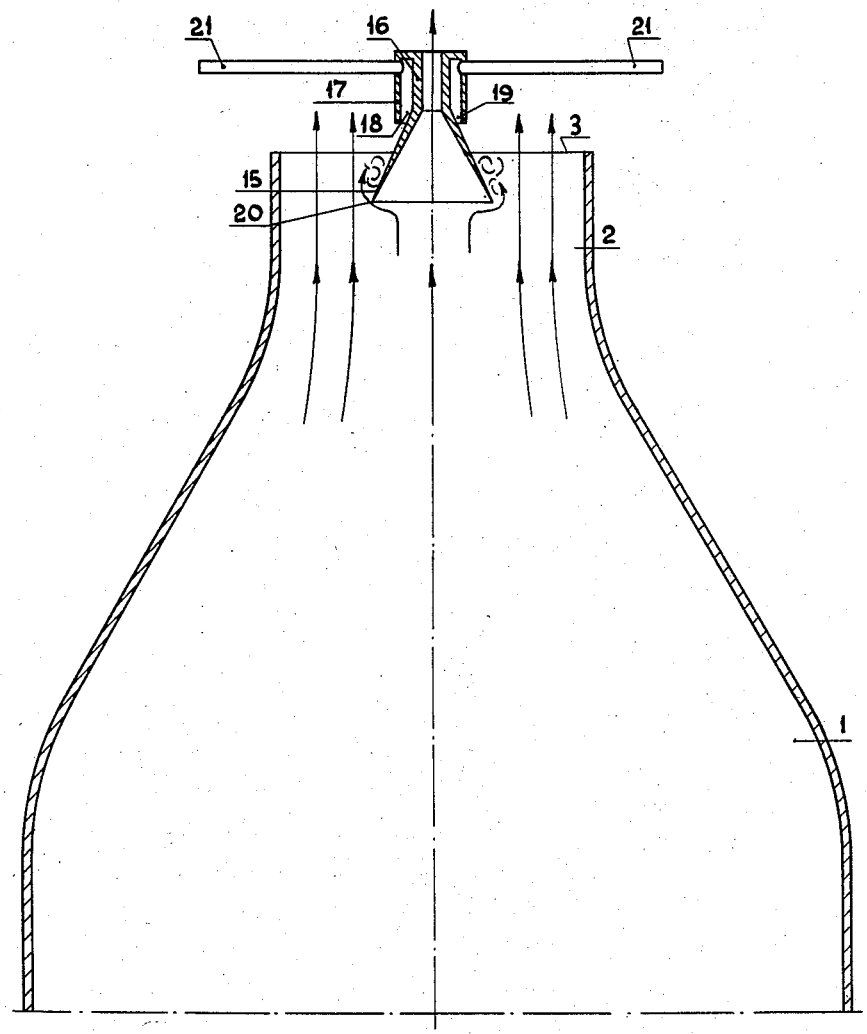
Fig. 3 shows a third embodiment.

In Figs. 1–3 reference numeral 1 shows an air duct provided with a tapering mouth piece 2, through which 2.5 to 3 m.³ air are supplied per minute under a pressure head of 10–20 cm. water column. Orifice 3 has a diameter of approximately 120 mm., the air velocity therein being approximately 40–50 m. sec. The bodies located in the air stream, shown in Figures 2 and 3 may have an upstream base of about 50 mm. diameter.

In Fig. 1 a hollow body is positioned in the constricted mouth piece, extending itself across said mouth piece and having substantially the shape of a double wedge. The upstream wedge is positioned under a certain angle with respect to the duct axis, the downstream wedge pointing in the axis direction. As is apparent from the arrow, showing the general direction of the air flow, a high velocity zone is created adjacent edge 6 of the body, the downstream wedge preventing the formation of an extensive wake zone behind body 4. The body 4 is hollow and is provided with a narrow slit-shaped orifice 5, from which the liquid to be atomized is discharged along the surface of said body in the direction of the upstream edge 6. The liquid is fed to body 4 through orifices 7 by means of appropriate liquid ducts not shown in the drawing. The liquid when arrived at or in the immediate vicinity of the upstream edge of body 4 is finally atomized by the air flowing around said edge.

In Fig. 2 the mouth piece 2 of the air duct 1 is provided with a rotation symmetric body positioned co-axially therewith. This body comprises a cone 8 and a frustum cone 9, provided with an extension 10 screwed into cone 8. Cone 8 is provided with a chamber 11, whose rear edge is slightly spaced from the outer surface of the frustum cone 9, providing thereby a narrow annular gap 12. The liquid to be atomized is fed to chamber 11 by means of ducts 14 and is spouted from said chamber over the outer surface of cone 9 in the direction of the upstream edge 13, where it is atomized. The ducts 14 serve at the same time to support the conical body 8, 9.

Fig. 3 shows a body of revolution positioned in the air duct mouth piece coaxially therewith. This body has the shape of a funnel comprising a conical part 15 and a cylindrical part 16 pointing in downstream direction. A hollow cylinder body 17 surrounds part 16 and is connected therewith at its downstream end providing thereby a chamber 18 for the liquid to be atomized and leaving a narrow annular gap 19 between its upstream edge and the conical part 15. The liquid to be atomized is fed to chamber 18 by means of ducts 21, which at the same time provide a support for the funnel-shaped body. The liquid is spouted from this chamber through orifice 19 over the outer surface of cone 15 towards its upstream edge 20. At said upstream edge the liquid film is disrupted into fine droplets by the air flowing around said edge, which droplets are carried away by the air stream. A part of the air carried by the duct passes through cone 15 and cylinder 16 connected therewith and strongly reduces the wake behind the body of revolution.

Figure 4:
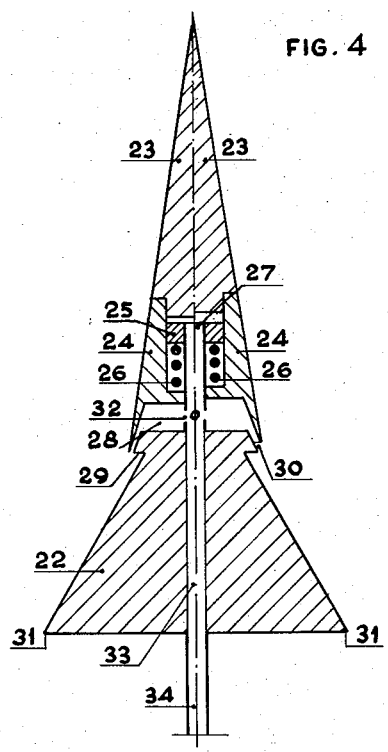
Fig. 4 shows in section a fourth embodiment, the left half of the figure representing the apparatus in a closed, and the right half in the open state.

Fig. 4 shows a body of revolution according to the invention suitable to be positioned in an air duct mouth piece co-axially therewith. This body is somewhat similar to that shown in Fig. 2 and comprises a conical body consisting of part 23 and 24 fixed to each other and a cone frustum body 22. Body 22 is fixed to a liquid duct 34 and is provided with an axial bore 33 in line with the duct. The downstream end of body 22 is provided with a tubular extension 27 in line with bore 33 and provided with holes 32 and with a ring 25 positioned around the downstream end part of the tubular extension. The body 24 is slidably mounted on this tubular extension 27 and the ring 25. A liquid chamber 28 is provided between the bodies 22 and 24, communicating with the interior of pipe 27 through holes 32. A helical spring 26 tends to force a conical part 23, 24 in upstream direction until the upstream end of body 24 contacts the enlarged portion 29 of body 22, closing thereby chamber 28. When sufficient pressure is supplied to the liquid flowing through pipe 34, the liquid pressure acting on the inner surfaces of chamber 28 will displace the body 23, 24 in downstream direction as represented in the right half Fig. 4, compressing thereby the helical spring 26 and providing a narrow annular orifice 30 through which the liquid will be projected as a thin film towards the upstream edge 31 of body 22. Air flowing around said edge will atomize the liquid and carry the drops away.

Figure 5:
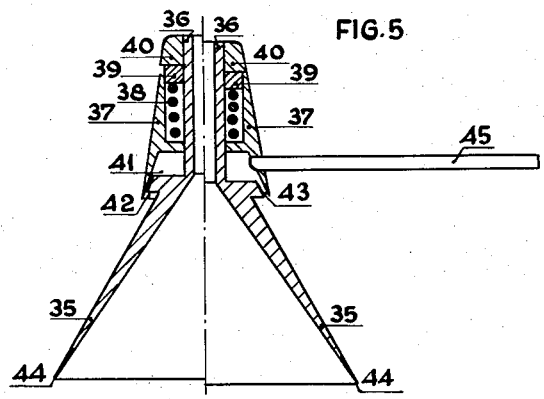
Fig. 5 shows a fifth embodiment, closed in the left part of the figure and open in the right part.

Fig. 5 shows a body of revolution suitable to be positioned in an air duct mouth piece co-axially therewith. Analogously to the embodiment shown in Fig. 3 this body comprises a hollow frustum cone 35 and a hollow cylinder 36. The cylindrical part 36 slidably arranged within a part 37 shaped as a frustum cone. A ring 40 is fixed at the downstream end of part 36 serving as an abuttment thereto. A second ring 39 positioned around part 36 and contacting ring 40, serves to guide part 36 within part 37. A helical spring 38 tends to displace the part 35, 36 in downstream direction with respect to part 37 until the latter is contacted by the annular extension 42 of part 35. This position is shown in the left part of Fig. 5. A liquid chamber 41 is provided between part 37 and part 35, 36, to which the liquid to be atomized is fed through a duct 45 which duct acts at the same time as a support for the device. In the left part of Fig. 4 the liquid chamber 41 is closed by spring 38 preventing thereby any liquid escaping from said chamber. If, however, sufficient pressure is applied to the liquid, the pressure head prevailing in the chamber 41 will force the part 35, 36 in upstream direction as shown in the right part of Figure 5, compressing thereby the helical spring 38 and affording a narrow annular passage 43 to the liquid which is spouted from chamber 41 in the direction of edge 44 to be atomized and carried away by the air stream flowing around said edge.

A part of the air carried by the air duct will flow through the hollow cone 35 and the hollow cylinder 36 preventing an extensive wake zone downstream of the device.

Figure 6:
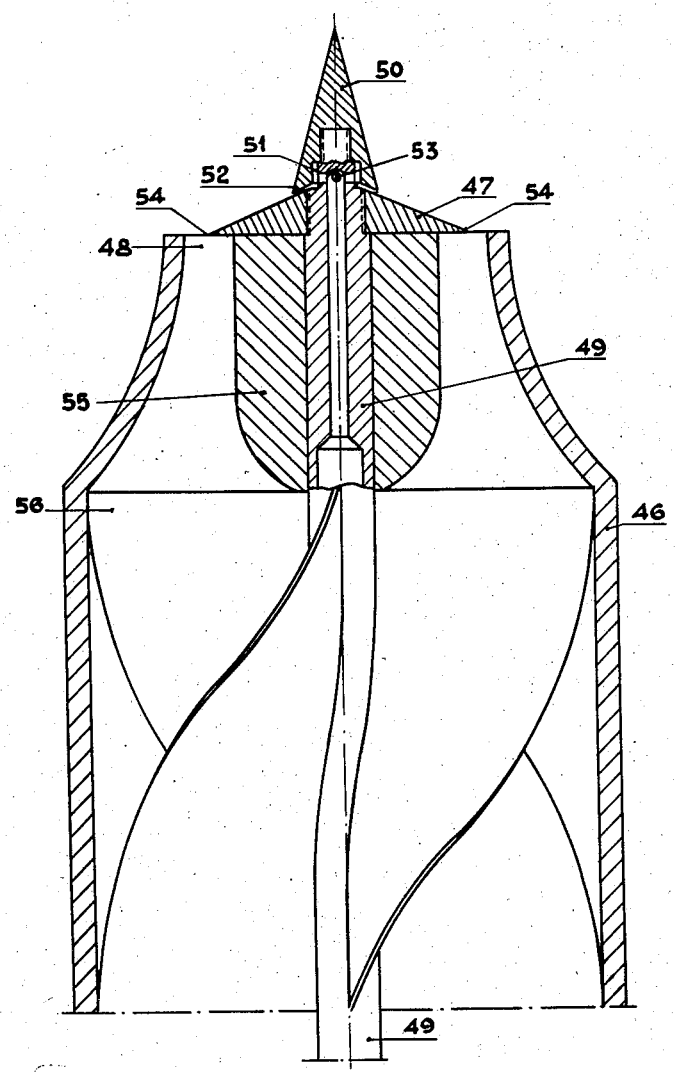

Fig. 6 shows another embodiment of the device according to the invention. In the constricted mouth piece of an air duct 46 is positioned an atomizing device comprising a conical body 47, having its base lying in the plane of the air duct orifice. An annular gap 48 is provided between the mouth piece and the cone edge 54 giving passage to the air. The cone 47 is screwably mounted on a liquid duct 49, which is positioned within the air duct co-axially therewith. The end of the liquid duct 49 carries a conical body 50, which is provided with a chamber 51, to which chamber the liquid to be atomized is fed from the liquid duct through holes 53. A conical body 50 is slightly spaced from cone 47, providing thereby a narrow annular passage 52 for the liquid to be atomized. This liquid fed through the duct 49 to the chamber 51 will leave this chamber through passage 52 and will flow as a thin film over the downstream surface of cone 47 towards its edge 54, where it will be disrupted into small droplets by the air and carried away.

The conical body 50 will prevent an extensive wake zone to be formed behind the apparatus, so that the atomized liquid will have no tendency to collect into bigger drops.

Investigations of the applicant have shown that if the orifice diameter of the air duct mouth piece is 20–30 mm. the annular gap may advantageously have a breadth of 1½–2½ mm. With these dimensions two litres of liquid can be atomized per minute requesting an air quantity of 0.3–0.6 m.³/min. having a velocity in said annular gap of 55–70 m./sec. and a pressure head of about 20–30 cm. water column.

Another embodiment shows Fig. 7. Reference numeral 58 shows an air duct provided with a constricted mouth piece 59. A liquid duct 60 is provided at its end with a substantially conical body comprising parts 61 and 62, which body is positioned in mouth piece 59 co-axially therewith. The liquid is discharged into the air stream flowing through the annular gap provided between the mouth piece 59 and the conical body through a narrow angular orifice 65. A conical downstream extension 63 of part 62 prevents the formation of an extensive wake zone behind parts 61, 62.

A further embodiment of the invention is shown in Fig. 8. Reference numeral 66 shows an air duct ending in a constricted mouthpiece 67. A liquid duct 68 positioned within the air duct carries at its end a body located co-axially in said mouth piece. This body comprises two main parts 69 and 71. The first part is shaped as a cylinder having a rounded upstream end and a conical downstream end the base 70 of which projects annularly beyond the cylinder. A liquid chamber 74 is provided within part 69 into which the liquid to be atomized is fed through duct 68 passing on its way through a sieve 73 screwably mounted in part 69. A movable part 71 is provided at the downstream end of part 69. This part is substantially conical in shape and is provided at its upstream end with a rod-like extension 75 passing through an axial hole of part 69 debouching in chamber 74. A helical spring is mounted within chamber 74 around said rod-like extension tending to force part 71 against part 69, making the edges 74 of said two parts to contact each other closing thereby the annular passage 77 provided between said two parts. When sufficient pressure is applied to the liquid fed to chamber 74 the pressure head acting on part 71 in the annular passage 77 will somewhat displace said part in downstream direction with respect to part 69. The liquid can now emerge through the narrow annular orifice between the edges 78 of parts 71 and 69 and will be atomized by the air flowing around said edges. A conical extension 72 of part 71 pointing in downstream direction prevents the formation of an extensive wake zone behind part 71. It has been found that this embodiment allows to atomize liquids at very divergent rates, even down to 5 cm.³/min., which can be of advantage for different applications. When small quantities of liquid are atomized it is not necessary to have a pressure head acting on the liquid as it will emerge from the annular orifice between the edges 78 under the influence of the negative pressure head of the air adjacent said edges.

It will be understood that other embodiments can be devised without leaving the scope of the invention. Also, the numeric data given in the specification must be considered as examples only and are therefore not intended to limit in whatever way the invention.

I claim:

1. A device for atomizing liquid by an air stream, comprising an air duct ending in a constricted mouthpiece, a deflection body disposed within said mouthpiece extending in upstream direction and ending on the upstream side in a sharp edge transversely displaced relative to the axis of said duct, said edge being defined by two surfaces of the body, of which the one situated on the upstream side forms with the axis of the duct at most a right angle, at least part of an air stream through the duct being deflected by said edge so as to flow around the same, and feed means disposed downstream of said edge for feeding liquid to be atomized in form of a thin film into the air stream part flowing around said edge, said feed means directing the liquid into said air stream part in upstream direction at an obtuse angle with the axis of the duct.

2. A device according to claim 1, wherein said deflection body includes a chamber for liquid and a slit shaped orifice extending from the chamber and directing liquid from said chamber upstream toward said sharp edge in form of a thin film, and wherein said liquid feed means comprise a conduit communicating with said chamber upstream of said edge.

3. A device according to claim 2, wherein said deflection body further comprises an extension extending in the downstream direction and tapered in the said direction.

4. A device according to claim 1, wherein said deflection body is in form of a body of revolution disposed in axial alignment with said duct and having on its upstream side a frusto-conical portion ending in a sharply edged rim, said rim in conjunction with said constricted mouthpiece constituting an abruptly narrowed passage for the air stream, said body including a chamber for liquid and an annular slit shaped orifice connecting chamber with the outside wall of said body and directing liquid from the chamber upstream toward said sharply edged rim in form of a thin film.

5. A device according to claim 4, wherein said orifice is situated downstream relative to said sharply edged rim for delivering liquid to an outside wall of said body leading to said rim.

6. A device according to claim 5, wherein said orifice is situated in relation to said frusto-conical portion of the body so as to deliver liquid to said sharply edged rim along the respective wall surface of said portion.

7. A device according to claim 1, wherein said deflection body is in form of a body of revolution disposed in axial alignment with said duct and having on its upstream side a frusto-conical portion ending in a sharply edged rim, said rim in conjunction with said constricted mouthpiece constituting an abruptly narrowed passage for the air stream, said body including a chamber for liquid and an orifice connecting the chamber with the outside wall of said frusto-conical portion and issuing in said sharply edged rim.

8. A device according to claim 1, wherein said deflection body is in form of a body of revolution disposed in axial alignment with said duct and having on its upstream side a frusto-conical portion ending in a sharply edged rim, said rim in conjunction with said constricted mouthpiece constituting an abruptly narrowed passage for the air stream, said body including a chamber for liquid and an annular slit shaped orifice connecting said chamber with the outside wall of said body and directing liquid from the chamber toward said sharply edged rim in form of a thin film, and wherein said body further comprises on its downstream side an extension extending in the downstream direction and tapered in the said direction.

9. A device according to claim 1, wherein said deflection body is in form of a body of revolution disposed in axial alignment with said duct and having on its upstream side a frusto-conical portion ending in a sharply edged rim, said rim in conjunction with said constricted mouthpiece constituting an abruptly narrowed passage for the air stream, said body including a chamber for liquid and an annular slip shaped orifice connecting said chamber with the outside wall of said body and directing liquid from the chamber toward said sharply edged rim in form of a thin film, and wherein said frusto-conical portion has an extension extending from the upstream face of said portion in form of a body of revolution and disposed coaxially with said portion, said extension having a maximum cross-sectional area less than the cross-sectional area of the upstream face of said portion.

10. A device according to claim 9, and further comprising guide means disposed within the air duct upstream of said body for imparting a spiral motion to air flowing through said duct.

11. A device according to claim 1, wherein said deflection body is in form of a body of revolution disposed in axial alignment with said duct and having on its upstream side a frusto-conical portion ending in a sharply edged rim, said rim in conjunction with said constricted mouthpiece constituting an abruptly narrowed passage for the air stream, said body including a chamber for liquid and an annular slit shaped orifice connecting said chamber with the outside wall of said body and directing liquid from the chamber toward said sharply edged rim in form of a thin film, said body further including an axial bore permitting part of the air to flow through the body from the upstream side of the body to the downstream side thereof.

12. A device according to claim 1, wherein said deflection body is divided in an upstream part and a downstream part axially displaceable relative to each other, said body including a chamber for liquid and said parts defining an orifice therebetween connected with said chamber for delivering liquid from the chamber to said upstream edge in form of a thin film, and wherein yieldable means are disposed between said parts biasing the latter toward each other to close said orifice, pressure of liquid within said chamber displacing said parts into a position relative one to the other opening said orifice.

13. A device according to claim 12, wherein said downstream portion has an extension extending in downstream direction and tapered in said direction.

14. A device according to claim 12, wherein said body has an axial bore extending through both said parts to permit a flow of part of the air through the body from the upstream side to the downstream side thereof.

15. A device according to claim 1, wherein said deflection body is in form of a body of revolution disposed in axial alignment with said duct and having on its upstream side a frusto-conical portion ending in a sharply edged rim, said rim in conjunction with said constricted mouthpiece constituting an abruptly narrowed passage for the air stream, said body including a chamber for liquid and an orifice connecting the chamber with the outside wall of said frusto-conical portion and issuing in said sharply edged rim, and wherein said body has on its downstream side an extension extending in the downstream direction and tapered in the said direction.

16. A device according to claim 15, wherein said frusto-conical portion has an extension extending from the upstream face of said portion in form of a body of revolution and disposed coaxially with said portion, said extension having a maximum cross-sectional area less than the cross-sectional area of the upstream face of said portion.

17. A device according to claim 16, wherein said deflection body is divided in an upstream part and a downstream part axially displaceable relative to each other, said body including a chamber for liquid and said parts defining an orifice therebetween for delivering liquid from said chamber to said upstream edge in form of a thin film, and wherein yieldable means are disposed between said parts biasing the latter toward each other to close said orifice, pressure of liquid within said chamber displacing said parts into a position one relative to the other opening said orifice, and wherein guide means are disposed within said air duct upstream of said body for imparting a spiral motion to air flowing through said duct.

References Cited in the file of this patent

UNITED STATES PATENTS

| | | |
|---|---|---|
| 1,033,068 | Griffiths | July 16, 1912 |
| 1,124,579 | Ambursen | Jan. 12, 1915 |
| 1,688,827 | Nelson | Oct. 23, 1928 |
| 1,785,804 | Adams | Dec. 23, 1930 |
| 1,848,122 | Forster | Mar. 8, 1932 |
| 2,200,673 | Kinder | May 14, 1940 |
| 2,275,691 | Simanton | Mar. 10, 1942 |
| 2,770,501 | Coanda | Nov. 13, 1956 |

FOREIGN PATENTS

| | | |
|---|---|---|
| 648,289 | Germany | July 27, 1934 |
| 558,291 | Great Britain | Dec. 30, 1943 |
| 661,254 | Great Britain | Nov. 21, 1951 |
| 676,966 | Great Britain | Aug. 6, 1952 |